May 5, 1931.  T. S. EWART  1,804,252
REVERSE GEARING
Original Filed May 31, 1928
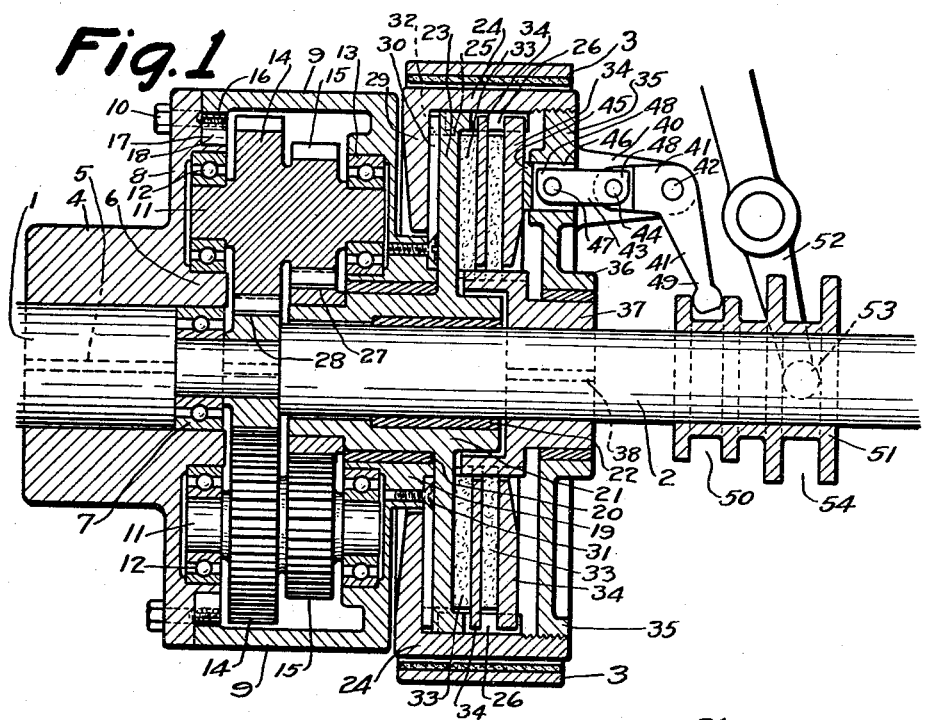
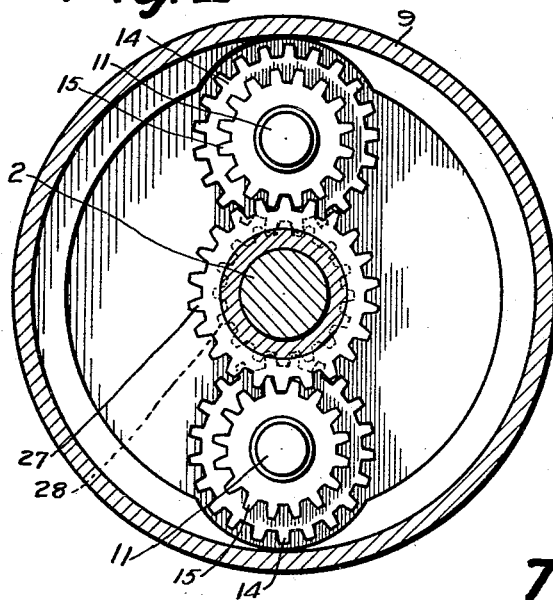
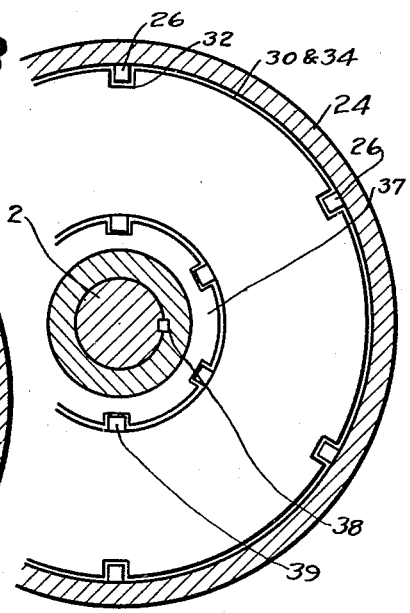
INVENTOR
*Thomas S. Ewart*
*Harry Bowen*
ATTORNEY Patented May 5, 1931

1,804,252

UNITED STATES PATENT OFFICE

THOMAS S. EWART, OF RAYMOND, WASHINGTON, BY JUDICIAL DECREE TRANSFERRED TO LAURA V. EWART

REVERSE GEARING

Application filed May 31, 1928, Serial No. 281,658. Renewed October 6, 1930.

The invention is an assembly of gears, brakes and clutches through which the direction of rotation of part of a shaft may readily be reversed, and which is also adaptable to be used as a speed reducing unit.

The object of the invention is to provide a reverse clutch which may be locked to drive the entire shaft as a unit, or held to drive a portion of the shaft in the opposite direction, and which will release the shaft when in the free position.

Another object of the invention is to provide a combination of gears through which a comparatively large speed reduction may be obtained in very little space.

A further object of the invention is to provide a reverse clutch which is designed in such a manner that the wear upon the working parts is reduced to a minimum.

And a still further object of the invention is to provide a reverse gearing device which is of a simple and economical construction.

With these ends in view the invention embodies a drive shaft, a driven shaft, a housing with a plurality of gears on stub shafts fixedly attached to the end of the drive shaft and with some of the gears meshing with a gear on the end of the driven shaft, a floating member having a gear meshing with some of the gears on the stub shafts, a clutch for holding the floating member in relation to the driven shaft, a housing for the said clutch and floating member, said housing being keyed to the said floating member, and a brake for holding the said housing and floating member in a stationary position.

Other features and advantages of the invention will appear from the following description, taken in connection with the drawings, wherein:—

Figure 1 is a longitudinal section through the device.

Figure 2 is a cross section through the gear housing.

Figure 3 is a cross section of the clutch housing with part broken away.

In the drawings the device is shown as it would be made where numeral 1 indicates the drive shaft, numeral 2 the driven shaft and numeral 3 the brake.

A hub 4 is fixedly mounted on the end of the drive shaft and held by a key 5. The inner end of the hub extends beyond the end of the shaft as indicated by the numeral 6 and the inner end of the driven shaft is rotatably mounted in a bearing 7 therein. The hub 4 is provided with a flange 8 to which the gear housing 9 is rigidly attached by bolts 10. Stub shafts 11 are rotatably mounted in bearings 12 and 13 in the hub and housing and these shafts are provided with gear members 14 and 15 as shown. The end of housing 9 is provided with a flange 16 which is placed in a recess 17 at the outer end of the flange 8 and the flange 16 is provided with recesses as indicated by the numeral 18 through which the gear members 14 may pass in assembling the device.

The inner end of the housing 9 is provided with a hub 19 which is mounted through a bearing 20 on a floating member 21 and the member is rotatably mounted on the driven shaft 2 through a bearing 22 as shown. The member 21 is provided with an outwardly extending flange 23 which extends into a clutch housing 24 and the edge of the flange 23 is provided with notches 25 which fit over keys 26 to cause the members 21 and the housing 24 to rotate as a unit. It will be noted that the keys 26 terminate short of the disc 30 so that the edge of the disc is free and may rotate independent of the members 23 and 24. At the inner end of the member 21 is a gear 27 that meshes with the gear members 15 on the shafts 11 and it will be observed that as the housing 24 is held stationary by the brake 3 the gear will cause the gear members to rotate and they will rotate the driven shaft 2 in the opposite direction to that of the drive shaft through a gear 28 fixedly mounted on the end of the driven shaft.

One end of the housing 24 extends inward forming a flange 29 and between the flange 29 and the flange 23 is a disc 30 which is rigidly attached to the hub 19 of the housing 9 by screws 31 as shown. The outer edge of the disc 30 is provided with notches 32 to pass over the keys 26 when assembling. The clutch is formed with fibre discs 33 and metal discs 34 as shown, and the outer end of the housing is provided with a head 35 that is screwed into the housing as shown. At the center of the head 35 is a hub 36 which is rotatably mounted on a collar 37 through a bearing as shown and the collar 37 is keyed to the driven shaft 2 by a key 38. The collar 37 is provided with notches to receive keys 39 on the discs 33 to cause the discs to rotate with the collar. The head is also provided with ears 40 between which cranks 41 are pivotally mounted on pins 42. The inner ends of the cranks are attached to levers 43 through pins 44 and the inner ends of the levers are pivotally attached to slidable members 45 in slots 46 through pins 47. The levers 43 are provided with heels 48 to limit the outward movement. The outer ends 49 of the cranks 41 are slidably held in a slot 50 in a collar 51 and the collar is slidably operated by a yoke 52 through pins 53 the ends of which are slidable in a slot 54. The yoke may be mounted and operated in any suitable manner.

The brake 3 may be of any suitable type or design and may be arranged in any suitable manner or any other means may be used for engaging and holding the clutch housing 24.

It will be understood that other changes may be made in the construction without departing from the spirit of the invention. Or of which changes may be in the arrangement of the gears as it is understood that more than two sets of the orbital gears may be used if desired, another may be in the use of a housing of a different type or in the arrangement of the gears in the housing, another may be in the use of a clutch of a different type or design or in the use of other means of operating the clutch, and still another may be in the use of a different type of connection between the clutch and the gear housing.

The construction will be readily understood from the foregoing description. To use the device it may be installed as shown with the hub 4 on the end of a drive shaft and with a driven shaft extending into the device as shown. When it is desired to drive straight ahead the clutch is thrown into the position shown in which it will hold the clutch and gear housing so that the entire device will rotate as a unit; and when it is desired to rotate the driven shaft opposite to the drive shaft the clutch is released and the clutch housing held stationary by the brake and it will be observed that with the gear 27 held stationary the gear shafts 11 will rotate about their centers as they rotate orbitally and therefore the gears 14 will rotate the driven shaft 2 in a direction opposite to that of the drive shaft. With the brake and clutch both released, the gears 14 and 15 will rotate about the gears 27 and 28 so that the shaft 2 may remain stationary, thereby providing a neutral position. This construction and arrangement of parts therefore makes it possible to provide a reverse gearing with straight ahead, reverse and neutral positions in a comparatively simple and inexpensive device.

It will also be observed that by changing the gear ratio the device may be used for speed reduction, and by using two of the devices in combination a large speed reduction may be obtained in a very small space.

Having thus fully described the invention, what I claim as new and desire to secure by Letters Patent, is:

In a reverse gear, a drive shaft, a hub at the end of the said drive shaft, a driven shaft with the end journaled in the hub at the end of the said drive shaft, a gear adjacent the end of the said driven shaft, planetary gears meshing with the said gear on the driven shaft, stub shafts upon which the said planetary gears are mounted, other planetary gears on the said stub shafts, a housing in which the said stub shafts are rotatably mounted, means for rigidly attaching the housing to the hub on the said drive shaft, a sleeve having an outwardly extending flange rotatably mounted on the said driven shaft, a gear on the said sleeve meshing with the planetary gears on the said stub shafts specified as other planetary gears, a clutch housing into which the outwardly extending flange of the sleeve extends, a disc rigidly attached to the gear housing and positioned between the end of the clutch housing and flange, a plurality of fibre and metal discs in the said clutch housing forming the friction members, keys in the said clutch housing engaging slots in the outer edges of the said outwardly extending flange and metal discs, a head in the said clutch housing, suitable locking members in the said head for frictionally holding the members within the said clutch housing, and a suitable brake on the outer surface of the said clutch housing by which the said clutch and gear housing may be held stationary.

THOMAS S. EWART.